United States Patent [19]

Kaneko et al.

[11] Patent Number: 5,521,781
[45] Date of Patent: May 28, 1996

[54] SUBSTRATE FOR MAGNETIC RECORDING MEDIUM

[75] Inventors: Hideo Kaneko, Kanagawa-ken; Yasuaki Nakazato; Toyofumi Aoki, both of Nagano-ken; Itsuo Kuroyanagi, Chiba-ken, all of Japan

[73] Assignee: Shin-Etsu Chemical Co., Ltd., Tokyo, Japan

[21] Appl. No.: 447,056

[22] Filed: May 22, 1995

Related U.S. Application Data

[63] Continuation of Ser. No. 143,043, Oct. 29, 1993, abandoned.

[30] Foreign Application Priority Data

Oct. 30, 1992 [JP] Japan ..................................... 4-316058

[51] Int. Cl.⁶ ............................. G11B 5/82; H01L 21/302
[52] U.S. Cl. ...................... 360/135; 437/947; 156/644.1; 156/657.1
[58] Field of Search ............................. 360/135; 156/645, 156/653, 657; 437/947, 981

[56] References Cited

U.S. PATENT DOCUMENTS 5,180,469   1/1993   Abe ......................................... 156/653
5,223,450   6/1993   Fujino et al. ............................. 437/62
5,316,620   5/1994   Hasegawa et al. ...................... 156/645

FOREIGN PATENT DOCUMENTS 0547820   6/1993   European Pat. Off. .
0420721   of 0000   United Kingdom .

OTHER PUBLICATIONS

Patent Abstracts of Japan, vol. 9, No. 37, Abstract of JP–59177729, Aug. 10, 1994, titled "Magnetic Disc".

Primary Examiner—Stuart S. Levy
Assistant Examiner—George J. Letscher
Attorney, Agent, or Firm—Wenderoth, Lind & Ponack

[57] ABSTRACT

Proposed is a substrate of a magnetic recording medium in the form of an annular disk made from a single crystal of silicon which is imparted with greatly improved mechanical strengths to withstand mechanical shocks and high-velocity revolution. Different from conventional annular disks as formed by a mechanical working to form the outer contour and the circular center opening, the peripheral surfaces of the inventive annular disk are freed from the work-stressed surface layer by a chemical etching treatment undertaken after the mechanical working.

2 Claims, 3 Drawing Sheets

SUBSTRATE FOR MAGNETIC RECORDING MEDIUM

This application is a continuation of now abandoned application, Ser. No. 08/143,043, filed Oct. 29, 1993, now abandoned.

BACKGROUND OF THE INVENTION

The present invention relates to an improved substrate of a magnetic recording medium, referred to simply as a substrate hereinafter, such as a disk prepared, for example, from a wafer of a single crystal of silicon.

Along with the rapid progress of the information-predominant society in recent years, the demand is also rapidly increasing for large-capacity recording media for information used in computers and other electronic data-processing machines. In particular, it is a remarkable trend that magnetic memory disks which play a core role as an external memory unit in computers are required to have a recording capacity and recording density increasing year by year so that intensive and extensive investigations are now under way to develop a magnetic memory disk suitable for high-density recording. Besides the increased recording density mentioned above, the development works on one hand are directed to a magnetic recording disk having improved mechanical strengths in view of the recent progress in very compact portable computers such as the so-called notebook-type or palm-top personal computers of which the recording system naturally must be capable of withstanding mechanical shocks. If not to mention mechanical shocks, magnetic recording disks must have high mechanical strengths to withstand the considerably high velocity of revolution when they are under operation as is mentioned later.

As is known, the most conventional material for the substrates, which is made from a non-magnetic material and has an annular form of a disk with a circular outer contour and provided with an also circular concentric center opening, is an aluminum-based alloy while, as a trend, aluminum alloy-made substrates cannot meet the increasing requirements for a smaller surface roughness to enable an increase in the recording density as well as higher abrasion resistance to ensure longer durability of the magnetic disks. These requirements necessitate the use of a material having an increased hardness. Along with the development of very compact computers, in particular, it is essential that the power consumption for driving of the magnetic disk is as small as possible. In this regard, the substrate must be as light as possible although a large part of the power in magnetic disk driving is consumed in the spindle motor per se. In other words, a substrate material having a smaller specific gravity than aluminum-based alloys is desired.

Needless to say, the coercive force of the magnetic recording layer is an important factor to ensure a high recording density therein and should desirably be as high as possible. It is known that cobalt-based alloys as a class of the conventional materials for the magnetic recording layer have a higher and higher coercive force as the temperature of the film forming is increased up to a certain upper limit of the temperature. In this regard, it is a usual practice that the substrate of a magnetic recording medium is heated during the forming process of the magnetic recording layer by sputtering or other methods. This heating treatment, however, sometimes causes a serious trouble such as warping of the disk when the substrate is made from an aluminum-based alloy because, while it is usual that the surface of an aluminum alloy-made substrate is provided with a plating layer of NiP (nickel phosphide)-in order to avoid the problems of low abrasion resistance and poor machinability due to the low hardness of the aluminum-based alloys, of the considerably large difference in the thermal expansion coefficient between the aluminum-based alloy and the NiP plating layer. Moreover, a plating layer of NiP is rendered magnetic at a temperature of 280° C. or higher so that the temperature of the heating treatment of a NiP-plated substrate is necessarily limited.

Alternatively, glass-made substrates are under use partly in the manufacture of magnetic recording disks with an object to obtain a very small surface roughness not obtained with substrates of an aluminum-based alloy. A problem in such a glass substrate is that, since glass substrate plates are usually subjected to a tempering treatment in order to be imparted with increased mechanical strengths, warping is sometimes caused of a glass substrate when it is subsequently heated due to the presence of stressed surface layers which are under a compressive stress. While it is usual to use an infrared heater to heat up the substrate in the sputtering process in the formation of the coating layers, the power output of the infrared heater must be unduly increased in order to achieve the desired high temperature because glass substrates have a relatively low absorptivity of the infrared energy. Consequently, the forming process of the magnetic recording layer on the surface of a glass substrate is sometimes conducted at a temperature not high enough so that the thus formed magnetic layer has only a relatively low coercive force requiring a large electric power consumption in recording therein.

Further alternatively, substrate plates made from a single crystal of silicon are highlighted in recent years by virtue of the various advantageous properties of silicon single crystals including their good high-temperature performance, small thermal expansion coefficient, smaller specific gravity than aluminum-based alloys and adequate electric conductivity. Namely, a substrate of a silicon single crystal, as compared with a substrate of an aluminum-based alloy, has advantages including: safety from the risk of warping under heating as a consequence of absence of a surface layer of a different material or a stressed layer; and excellent heat resistance to withstand heating at a high temperature of 600° C. or higher. In addition, guide grooves for tracking and other surface structures can be readily formed on a silicon substrate by applying the technology of fine patterning works well established in connection with the manufacturing process of LSIs and other electronic devices.

The manufacturing process of substrates of a silicon single crystal is performed usually in the steps including: cylindrical grinding of a single crystal of silicon in the form of an elongated rod on a cylindrical grinding machine until a cylinder of the single crystal having a diameter equal to that of the desired substrate disks is obtained; boring the single crystal cylinder along the center axis of the cylinder concentrically with the outer surface of the cylinder to form a center bore having a diameter equal to that of the center opening in the annular substrate disk; slicing the thus bored single crystal cylinder in a plane perpendicular to the center axis of the cylinder into annular disks each having a center opening; lapping of the thus sliced annular disk to adjust the thickness and to remove the saw mark; chamfering of the outer periphery of the disk and the inner periphery facing the center opening so as to impart the chamfered peripheries with a trapezoidal cross sectional profile of a bevelled surface; and polishing of the surfaces of the disk so as to impart the disk with a thickness and surface condition desirable for a substrate.

The above mentioned chamfering work on the outer and inner peripheries of an annular disks as sliced and lapped is essential as a consequence of the high hardness but remarkable brittleness of a silicon single crystal as compared with aluminum-based alloys. If the chamfering work is omitted and the substrate of a silicon single crystal is finished to leave the peripheries each having a square or orthogonal cross sectional profile, namely, the sharp edges between the upper or lower surface of the disk and the peripheral surface are always under a risk of chipping which can be prevented by chamfering.

The above mentioned chamfering work of the peripheries of an annular disk of a silicon single crystal as sliced and lapped, however, involves another problem. Namely, the outer and inner peripheries of the annular disk after chamfering unavoidably have a stressed surface layer having a thickness of, for example, a few µm to several tens of µm affecting the mechanical strengths of the substrate as a whole eventually leading to formation of tiny cracks along the peripheries. Once formed, the cracks propagate by the high-velocity revolution of the magnetic recording disk to cause a decrease in the impact strength of the disk which consequently is subject to chipping or cracking in the manufacturing process of magnetic recording media. Such a trouble not only results in a great decrease in the productivity of acceptable products but also eventually causes damages on the apparatus in the manufacturing line and on the already finished, otherwise acceptable products due to scattering of fragments of the broken disks.

SUMMARY OF THE INVENTION

The present invention accordingly has an object to provide an improved substrate of a magnetic recording medium made from a single crystal of silicon in the form of an annular disk having a center opening in concentricity with the outer contour of the disk, which is imparted with an improved impact strength to withstand mechanical shocks in handling and high-velocity revolution of the magnetic recording medium prepared therefrom to be freed from the above described problems and disadvantages in the conventional silicon-made substrates.

Thus, the substrate of a magnetic recording medium provided by the invention is a mechanically formed annular disk of a single crystal of silicon having a circular center opening in concentricity with the outer contour of the disk, in which the outer periphery and the inner periphery facing the center opening, which are each preferably chamfered and shaped in the form of a rounded surface exhibiting a profile of an arc of circle in the axial cross section, are freed from stress, which is produced by mechanical working, by a chemical etching treatment.

DETAILED DESCRIPTION OF THE PREFERRED EMBODIMENTS

Although a wafer of a silicon single crystal having a diameter equal to that of the desired substrate can be obtained by slicing a single crystal rod having an approximately equal or slightly larger diameter, it is more productive that a single crystal rod having a diameter larger by at least twice of that of the substrate is sliced to obtain a number of wafers of a large diameter having an appropriate thickness to give a desired thickness of the substrate of, for example, 0.2 to 1.3 mm after lapping and a plural number of circular disks having a diameter of the substrate and a concentric center opening are taken by cutting such a large wafer by using, for example, a laser beam cutting machine. The diameter of the circular disk and the diameter of the center opening are each not particularly limitative.

Figure 1A:
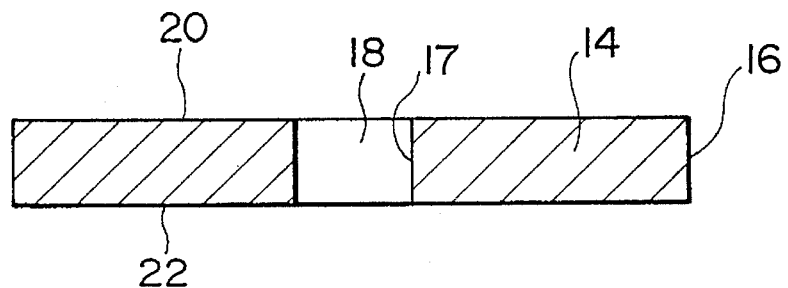
FIGS. 1a to 1c each illustrate an annular disk at a step for finishing of the peripheries by mechanical working and chemical etching in an axial cross sectional view.
Figure 1B:
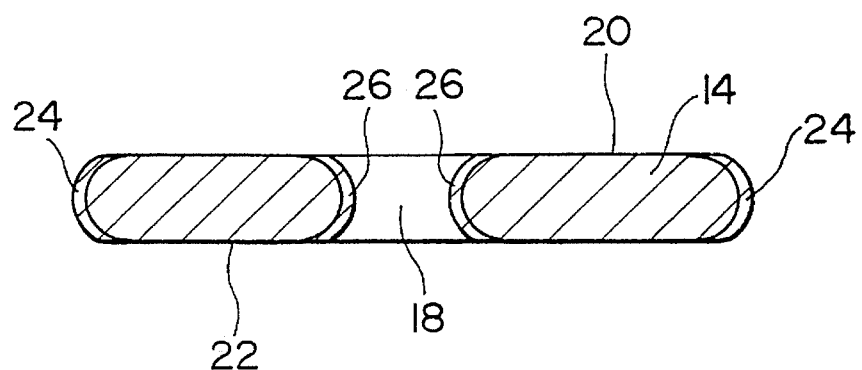

FIG. 1a illustrates such an annular disk 14 provided with a concentric center opening 18 by an axial cross sectional view. The outer periphery 16 and the inner periphery 17 facing the center opening 18 each have a square and edged cross sectional profile as cut by a laser beam cutting machine. In other words, the angles between the outer peripheral surface 16 or inner peripheral surface 17 and the upper surface 20 or lower surface 22 are each a right angle in the cross section. The annular disk 14 is then subjected to a mechanical chamfering work, for example, by using a chamfering grinder. Though optional, it is sometimes advantageous in order to further improve the mechanical strength of the annular disk that the edge lines formed by chamfering are further worked so as to be imparted with roundness as is illustrated in FIG. 1b by an axial cross sectional view. When such mechanical workings are undertaken, no demarcation line is found between the peripheral surface 16 or 17 and the upper and lower surfaces 20, 22. The radius of curvature of such a rounded peripheral surface should not exceed the thickness of the disk or, preferably, should be in the range from 0.1 to 0.2 mm.

Figure 1C:
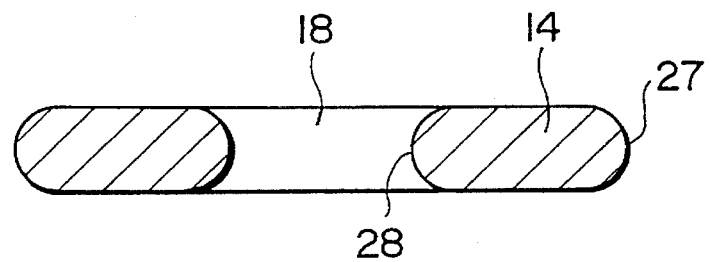

It should be noted that, as a consequence of the mechanical working to chamfer the peripheral surfaces 16 and 17, optionally, with roundness, the chamfered peripheral surfaces necessarily have a stressed surface layer 24 or 26 having a thickness of up to 10 µm or larger, as is illustrated in FIG. 1b. These work-stressed surface layers 24, 26 on the peripheral surfaces must be removed by chemical etching to give stress-free outer and inner peripheral surfaces 27 and 28 as is illustrated in FIG. 1c.

Figure 2:
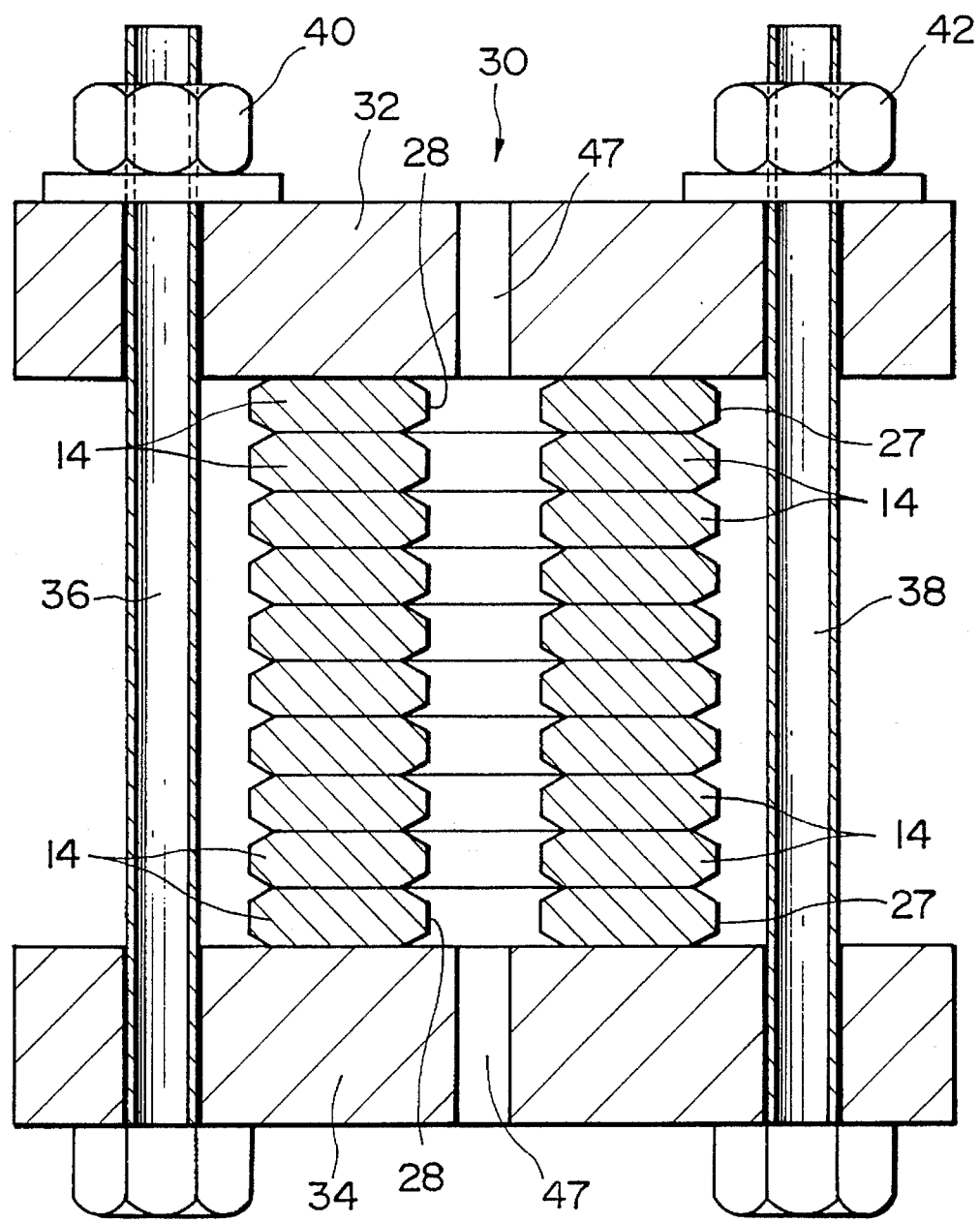
FIG. 2 is an illustration of the chemical etching process of a number of annular disks as a bundle.

The above mentioned chemical etching of the chamfered peripheral surfaces to remove the work-stressed layers 24, 26 can of course be performed by immersing the annular disks 14 one by one in an etching solution. It is a convenient way that a large number of the annular disks 14 after the mechanical working to make the surfaces 27, 28 of the outer and inner peripheries are stacked one on the other and fastened together between a pair of upper and lower presser plates 32, 34 of a clamping holder 30 each having an opening 47 to ensure free inflow of the etching solution by means of pairs of bolts 36, 38 and nuts 40, 42 as is illustrated in FIG. 2 by a cross sectional view and they are immersed altogether as held by the holder 30 in the etching solution so that the rounded surfaces 27, 28 alone are brought into contact with the etching solution so as to be freed from the work-stressed layer 24, 26 while the upper and lower surfaces 20, 22 of each of the disks 14 are left intact. It is of course optional that, instead of stacking the annular disks 14 directly one on the other as is illustrated in FIG. 2, an annular spacer disk is inserted between two adjacent annular disks 14.

The conditions of the above mentioned chemical etching treatment are not particularly limitative but can be conventional including the formulation of the etching solution which is acidic or alkaline. An example of the acidic etching solution is a 2:5:3 by volume mixture of hydrofluoric acid in a concentration of 50% by weight, nitric acid in a concentration of 70% by weight and methyl alcohol and an example of the alkaline etching solution is an aqueous solution of potassium hydroxide or sodium hydroxide in an appropriate concentration of, for example, 20% by weight. The chemical etching treatment is complete usually within 10 to 25 seconds at room temperature by using an appropriately formulated etching solution.

In the following, the advantages obtained by the inventive substrates are described in more detail by way of examples and comparative examples.

Examples and Comparative Examples.

A single crystal rod of silicon was sliced and cut to give a large number of annular disks having an outer diameter of 95.0 mm, inner diameter, i.e., diameter of the center opening, of 25.0 mm and thickness of 0.8 min. The outer and inner peripheral surfaces of each of these annular disks were chamfered by using a chamfering machine in the form of a bevelled surface having a trapezoidal cross sectional profile or a rounded surface by working along the edge lines formed by chamfering.

A number of these annular disks after chamfering were subjected to a chemical etching treatment of the chamfered surfaces of the outer and inner peripheries in a 20% by weight aqueous solution of potassium hydroxide at 80° C. for 10 minutes or in an acidic etching solution of the above described formulation at 30° C. for 35 seconds to remove the work-stressed layer on the peripheral surfaces.

Figure 3:
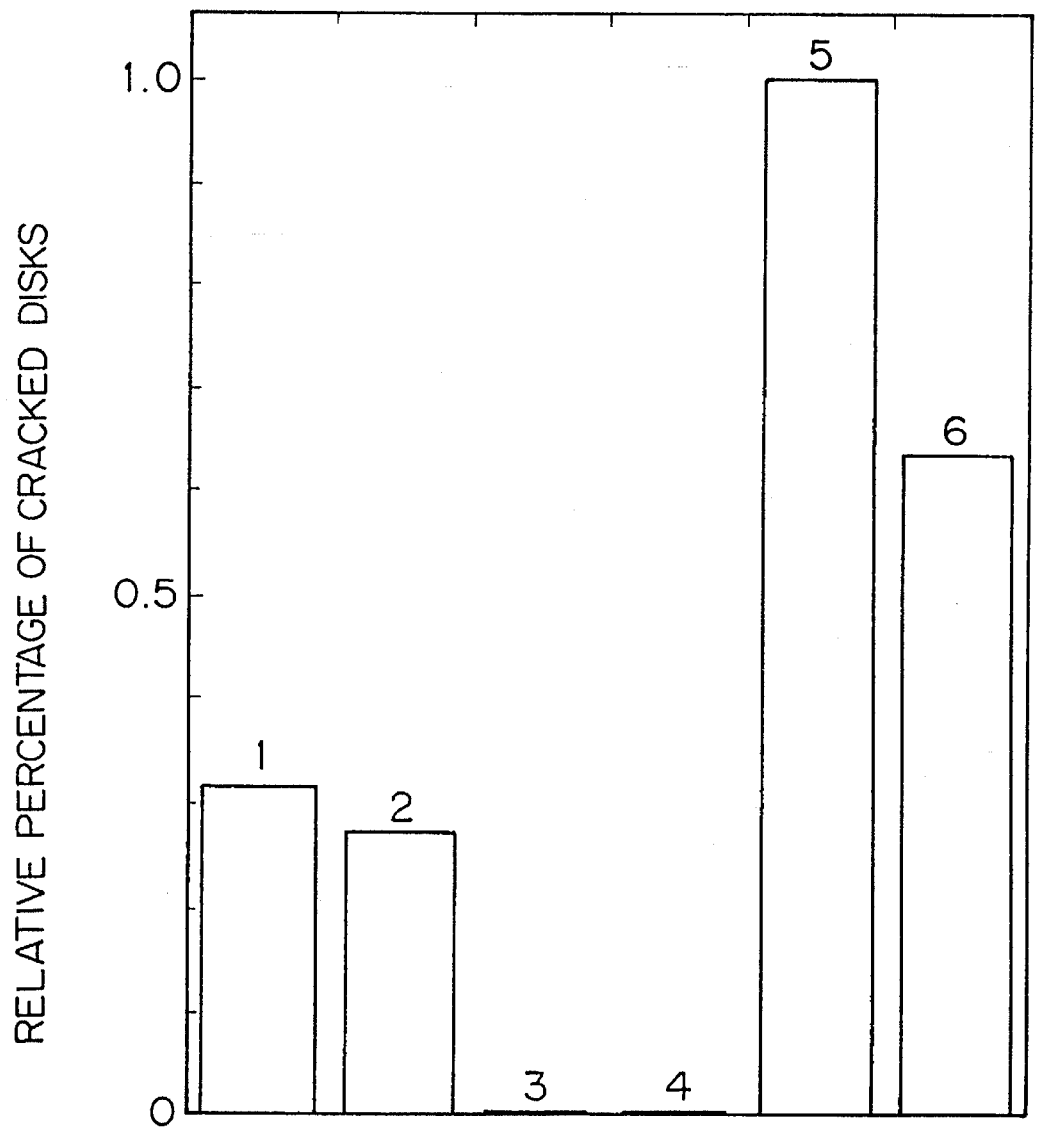
FIG. 3 is a bar graph showing occurrence of unacceptable products of annular disk substrates in relative percentages.

The thus prepared chamfered annular disks before or after the chemical etching treatment were each subjected first to a mechanical impact test by dropping from a height of 1 meter and then to a high-speed revolution test for the mechanical strengths. Each test consisted of 10 cycles of running including a 5 seconds period for the increase of revolution up to 15000 rpm, 5 minutes period for continued revolution constantly at the same velocity of revolution and 15 seconds period for the decrease of revolution to stoppage. The disks after the above described revolution test were examined visually and microscopically to detect crack formation on the inner peripheral surface. The disks were assessed to be unacceptable as a substrate of a magnetic recording medium when such a defect was detected. FIG. 3 of the accompanying drawing shows bar graphs each giving the relative percentage of the unacceptable disks taking the percentage in the unetched disks having bevelled peripheral surfaces as 1.0 (bar 5). The relative percentage of unacceptability was decreased to 0.64 when the bevelled peripheries were further mechanically worked to have a rounded surface (bar 6). The relative percentage of unacceptability was also decreased to about 0.3 when the disks having bevelled peripheral surfaces were subjected to the chemical etching treatment (bars 1 and 2 for the acidic and alkaline etching solutions, respectively). In contrast thereto, almost no occurrence of unacceptable disks was noted when the annular disks having rounded peripheral surfaces were subjected to the chemical etching treatment irrespective of the types of the etching solution (bars 3 and 4 for the acidic and alkaline etching solutions, respectively).

What is claimed is:

1. A substrate of a magnetic recording medium in the form of a mechanically formed annular disk of a single crystal of silicon having an outer periphery, and an inner periphery delimiting a circular center opening in concentricity with the outer periphery of the disk, wherein the outer and inner peripheral surfaces are constituted by rounded surfaces having a cross-sectional profile of that of a partial arc of a circle, wherein the radius of curvature of the rounded surface does not exceed a thickness of the disk, and wherein only the inner periphery delimiting the center opening and the outer periphery are freed from a stressed surface layer by a chemical etching treatment.

2. The substrate of a magnetic recording medium in the form of a mechanically formed annular disk as claimed in claim 1 in which said chemical etching treatment is performed by using an etching solution which is a methanolic solution of hydrofluoric acid and nitric acid in combination or an aqueous solution of potassium hydroxide or sodium hydroxide.

\* \* \* \* \*